(12) United States Patent
Wong

(10) Patent No.: US 7,137,584 B2
(45) Date of Patent: Nov. 21, 2006

(54) SOLDERING STATION

(76) Inventor: Chung M. Wong, 1755 14h Ave., San Francisco, CA (US) 94122

( * ) Notice: Subject to any disclaimer, the term of this patent is extended or adjusted under 35 U.S.C. 154(b) by 0 days.

(21) Appl. No.: 11/017,954

(22) Filed: Dec. 21, 2004

(65) Prior Publication Data
US 2006/0135004 A1    Jun. 22, 2006

(51) Int. Cl.
*B65H 18/28* (2006.01)
(52) U.S. Cl. ............ 242/171; 219/240; 211/70.6
(58) Field of Classification Search ........ 242/171; 219/240; 211/70.6
See application file for complete search history.

(56) References Cited

U.S. PATENT DOCUMENTS

| 4,762,979 | A | * | 8/1988 | Geoffroi | 219/242 |
| D406,513 | S | * | 3/1999 | Knapp | D8/71 |
| 6,209,732 | B1 | * | 4/2001 | Dennis et al. | 211/70.6 |

* cited by examiner

*Primary Examiner*—Truc Nguyen

(57) ABSTRACT

A soldering station of unitary construction includes a base member, a sidewall extending upwardly from a base member segment, and a horizontal support member extending from the sidewall. Alternative embodiments include a soldering iron holder and a second sidewall extending upwardly from a second base member segment and a second horizontal support member extending from the second sidewall.

12 Claims, 5 Drawing Sheets

SOLDERING STATION

BACKGROUND OF THE INVENTION

1. Field of the invention

The present invention generally relates to a soldering station and more particularly to a new soldering station, which allows an operator to continuously dispense different sizes of solders or copper de-solder braids with one hand while using the other hand to operate a soldering iron during soldering operations.

2. Description of the Prior Art

In manufacturing electronic products, different sizes of electronic and mechanical components are generally installed on a circuit board by a soldering process. Large sizes of solders are typically used to solder large components and small sizes of solders are typically used to solder small components. A conventional solder dispenser typically holds and dispenses only a single spool of solder without a soldering iron holder. A conventional soldering station typically holds a soldering iron without a solder dispenser. As a result, two or more solder dispensers and a soldering station are needed for a typical solder operation.

During printed circuit board repair or rework operations, a copper de-solder braid is often used to remove solders at component's leads before removing the component. A conventional solder dispenser cannot hold or dispense copper de-solder braids.

A conventional solder dispenser generally comprises of a solid base, two or three side walls, an open top or a removable top cover for loading a spool of solder onto a removable shaft which is then supported by the two sidewalls. Solder is dispensed by the rotational action of the shaft. Some solder dispensers dispense solder through a guided tube or a hole. Various problems exist with these kinds of solder dispensers that limit their use. For instance, if too tight, friction between the shaft and the sidewalls can prevent a spool of solder from rotating freely. The solder guide or the dispensing hole can jam a large diameter solder and cut a small diameter solder if not properly sized.

Conventional solder dispensers are mainly designed to hold and dispense only one spool of solder and none can dispense copper de-solder braids. If more than one size of solder is required during a soldering operation, several conventional solder dispensers would be needed. This arrangement does not allow for dispensing copper de-solder braids or provide support for a soldering iron and a cleaning sponge.

Known prior art soldering iron holders and solder dispensers include U.S. Pat. No. 6,276,623; U.S. Pat. No. 5,839,642; U.S. Pat. No. 4,159,795, U.S. Pat. No. 5,423,472, U.S. Pat. No. 4,690,318, U.S. Pat. No. 4,746,050, U.S. Pat. No. 6,027,068, U.S. Pat. No. 4,688,709, and U.S. Pat. No. 5,261,590.

Therefore there exists a need for a soldering station that overcomes the disadvantages of the prior art. Preferably the soldering station provides a low cost, unitary piece, jam-proof, side loading, freely rotational device that is capable of dispensing more than one spool of solder and copper de-solder braid.

BRIEF SUMMARY OF THE INVENTION

In accordance with one aspect of the invention, a soldering station of unitary construction includes a base member, a sidewall extending upwardly from a base member segment, and a horizontal support member extending from the sidewall.

In accordance with another aspect of the invention, a soldering station of unitary construction includes a base member, a sidewall extending upwardly from a base member segment, a horizontal support member extending from the sidewall, and a soldering iron holder extending from a second base member segment.

In accordance with yet another aspect of the invention, a soldering station of unitary construction includes a base member, a sidewall extending upwardly from a base member segment, a horizontal support member extending from the sidewall, a second sidewall extending upwardly from a second base member segment, and a second horizontal support member extending from the second sidewall.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and the objectives and advantages will become apparent from the accompanying drawings and descriptions. Such description makes reference to the accompanying drawings wherein.

DETAILED DESCRIPTION OF THE INVENTION

The present invention provides a soldering station generally designated 10 of unitary construction for supporting a plurality of solder spools and a plurality of copper de-solder braid spools. The structure of the soldering station may be formed using a CNC wire forming machine or a forming and bending machine to form a metal wire or rod into the configuration of the soldering station 10.

Figure 1:
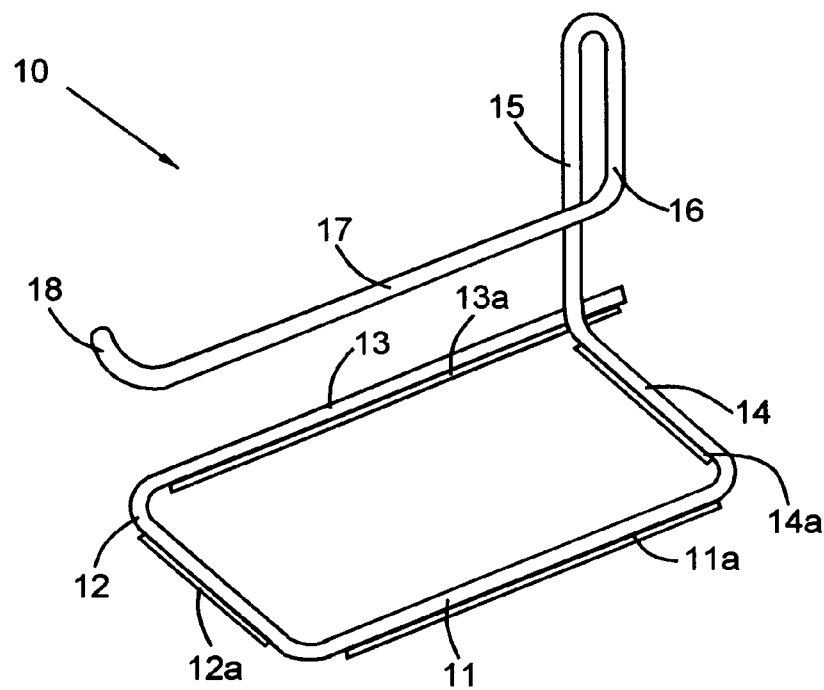
FIG. 1 is a perspective view of a soldering station according to the present invention.

With reference to FIG. 1, the soldering station 10 includes a base member having a front base member segment 11, a rear base member segment 13, a left base member segment 12, and a right base member segment 14.

A sidewall may be formed by a first pole 15 extending upwardly from the right base member segment 14 and a second pole 16 descending from the first pole 15. The second pole 16 is sized and configured so as to provide clearance for solder spools 54, 55 and copper de-solder braid spools 26, 27 (FIG. 5) positioned on a horizontal support member 17 extending horizontally from the second pole 16. The length of the horizontal support member 17 determines the number of spools of solders and copper de-solder braids that can be held thereon. An upwardly extending spool stop 18 may be formed at an end of the horizontal support member 17. Together with the sidewall, the spool stop 18 may constrain the solder spools 54, 55 and the copper de-solder braid spools 26, 27 from escaping the horizontal support member 17. Wire forming of the soldering station 10 may begin with the rear base member segment 13 or with the spool stop 18 as will be appreciated by those skilled in the art.

The base member of the soldering station 10 may be coated with a frictional substance 11a, 12a, 13a, and 14a to prevent slippage of the soldering station 10 during use.

Figure 2:
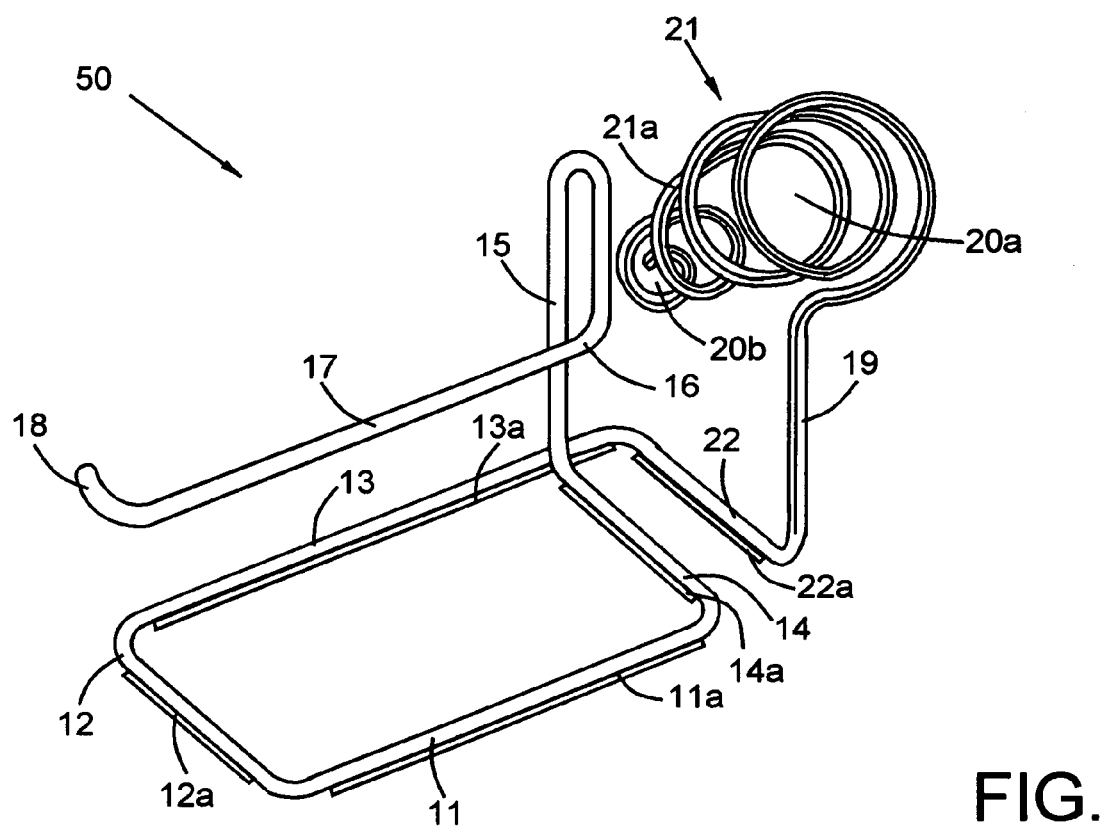
FIG. 2 is a perspective view of an alternative embodiment of the soldering station according to the present invention.
Figure 5:
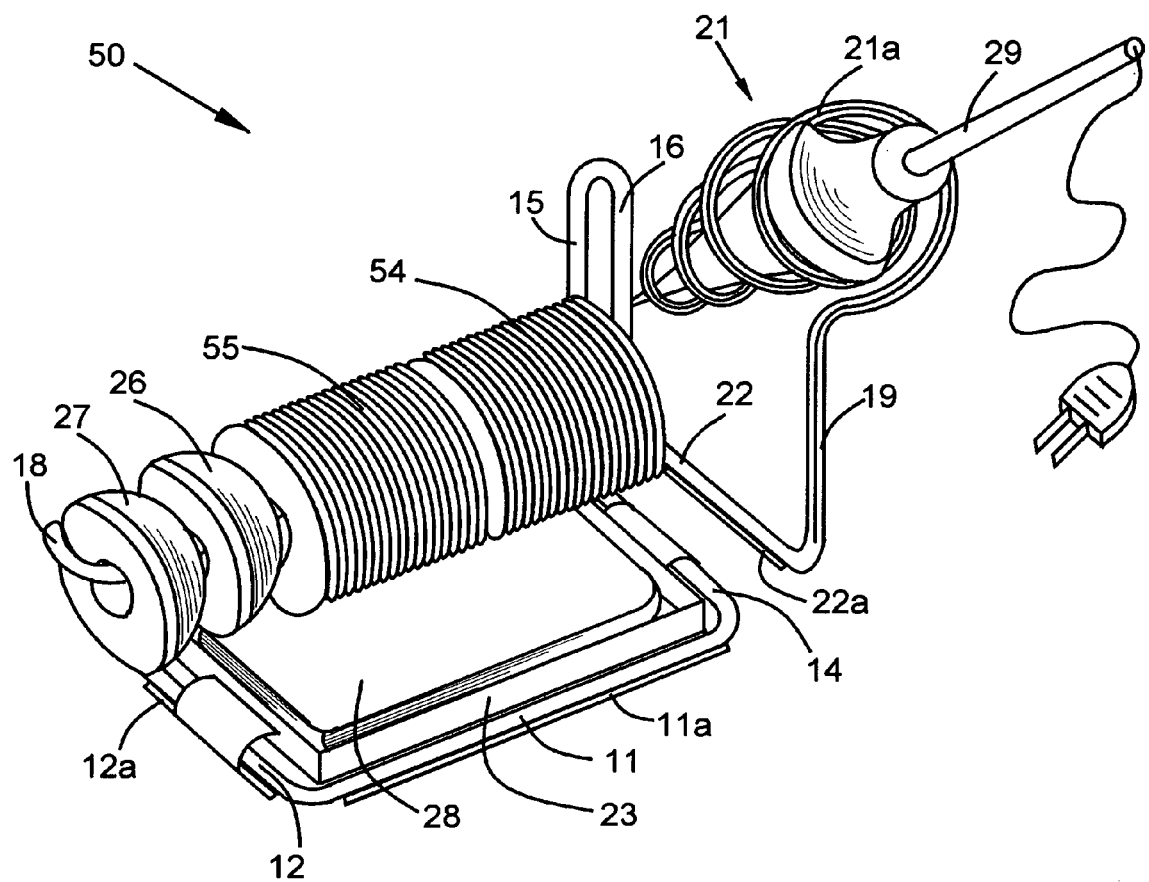
FIG. 5 is a perspective view of the soldering station showing the embodiment of FIG. 2 in use.

In another aspect of the invention, and with reference to FIG. 2, a soldering station generally designated 50 may include a soldering iron holder generally designated 21 formed adjacent to the soldering station 10 by extending the rear base member segment 13 a distance from the right base member segment 14 and forming a second right base member segment 22 extending parallel to the right base member segment 14. A third pole 19 may be formed extending upwardly from the second right base member segment 22 and terminating in a circular funnel shaped coiled member sized and configured to hold a soldering iron 29 (FIG. 5). The funnel shaped coiled member may include a top opening 20a terminating in a bottom opening 20b. The soldering iron holder 21 may be coated with a heat insulation substance 21a.

Figure 3:
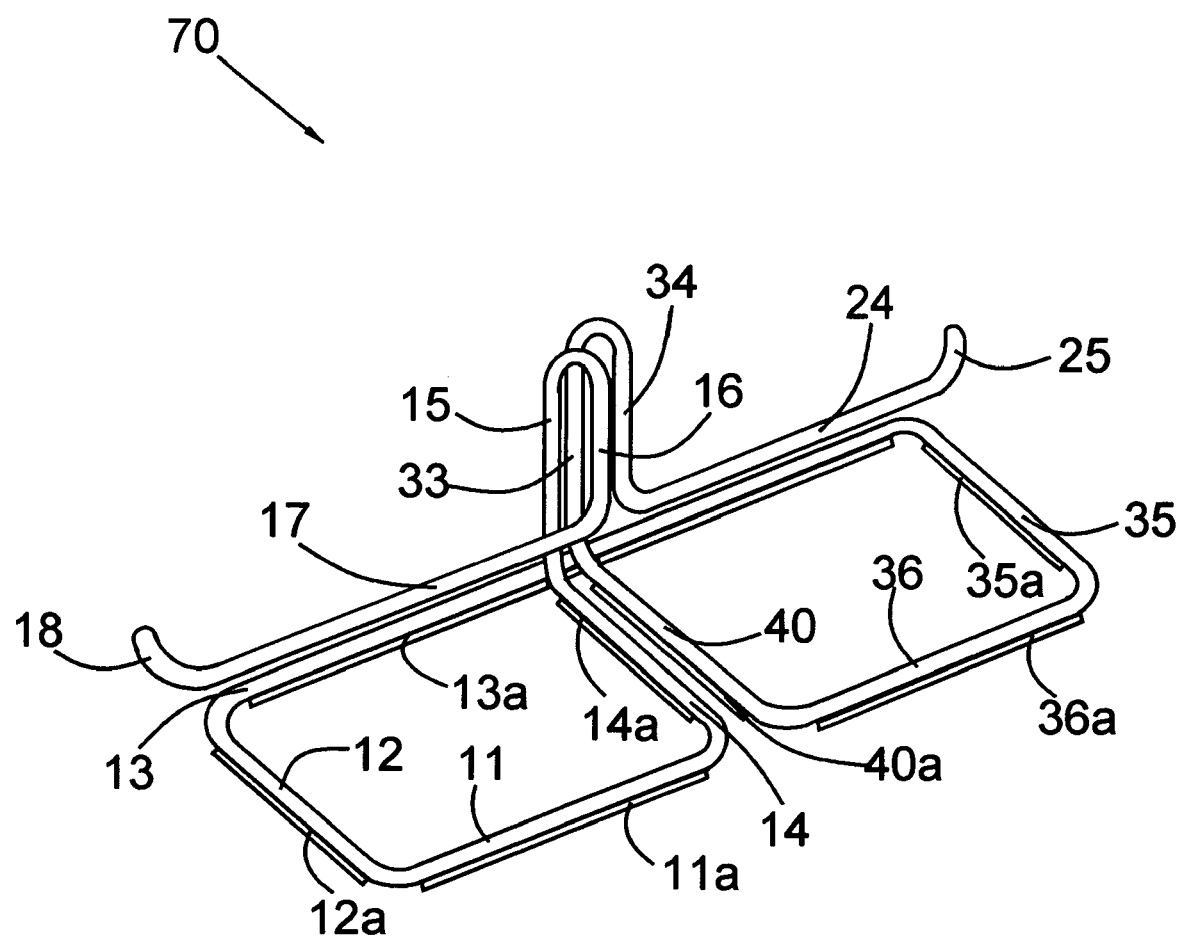
FIG. 3 is a perspective view of another alternative embodiment of the soldering station according to the present invention.

In yet another aspect of the invention, and with reference to FIG. 3, a soldering station generally designated 70 may include the rear base member segment 13 extended to a third right base member segment 35. The third right base member segment 35 may be disposed perpendicularly from the rear base member segment 13 and extend substantially parallel to the right base member segment 14. A second front base member segment 36 may extend from the third right base member segment 35 and terminate at a second left base member segment 40.

Figure 6:
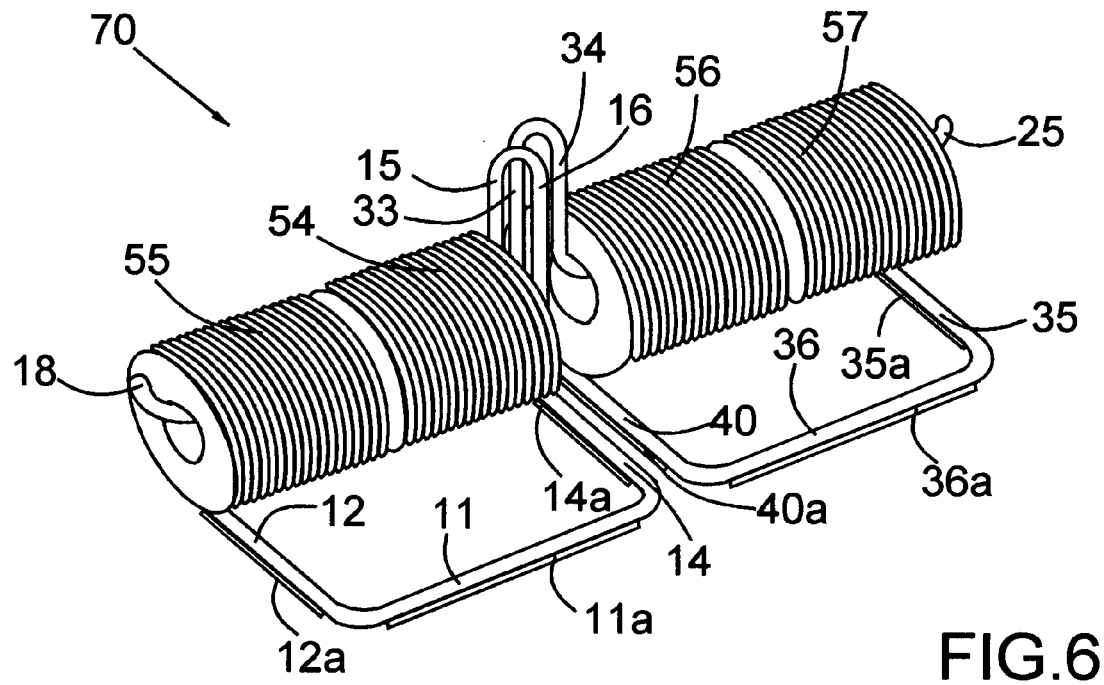
FIG. 6 is a perspective view of the soldering station showing the embodiment of FIG. 3 in use.
Figure 7:
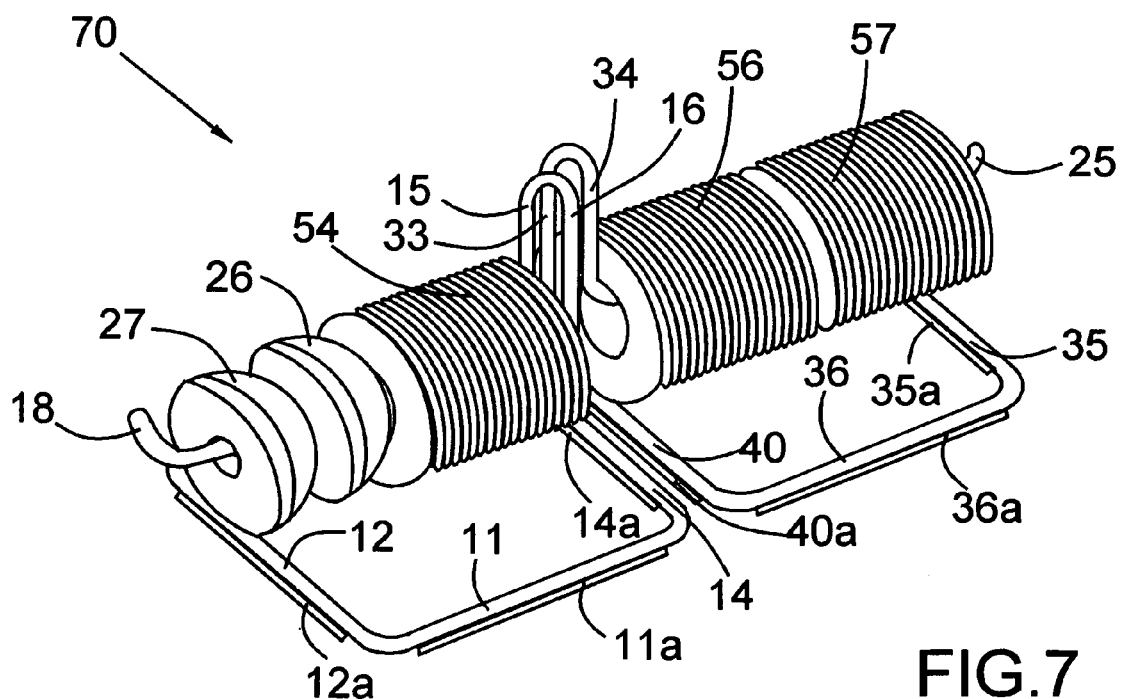
FIG. 7 is an alternative perspective view of the soldering station showing the embodiment of FIG. 3 in use.

A second sidewall may include a fourth pole 33 extending upwardly from the second left base member segment 40 and a fifth pole 34 extending downwardly from the fourth pole 33. The fifth pole 34 is sized and configured so as to provide clearance for solder spools 56, 57 positioned on a horizontal support member 24 extending horizontally from the fifth pole 34 (FIG. 6 and FIG. 7). The length of the horizontal support member 24 determines the number of spools of solders and copper de-solder braids that can be held thereon. An upwardly extending spool stop 25 may be formed at an end of the horizontal support member 24. Together with the second sidewall, the spool stop 25 may constrain the solder spools 56, 57 from escaping the horizontal support member 24.

The base member of the soldering station 70 may be coated with the frictional substance 11a, 12a, 13a, and 14a and a frictional substance 35a, 36a, and 40a to prevent slippage of the soldering station 70 during use.

Figure 4:
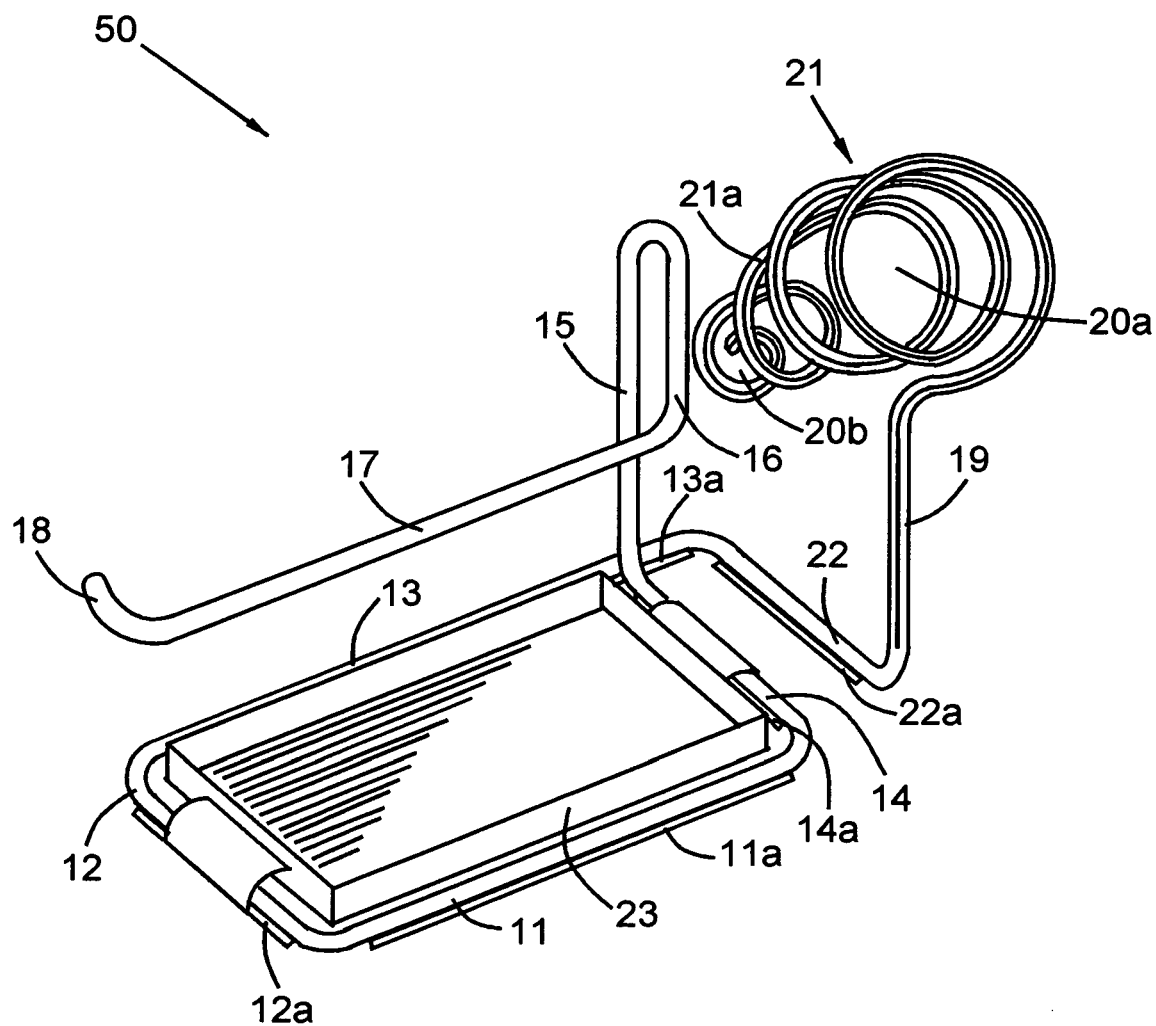
FIG. 4 is a perspective view of the soldering station showing the embodiment of FIG. 2 including an attached sponge container.

With reference to FIG. 4, the base member of soldering station 50 may be sized and configured to accept a container 23 useful for holding a soldering iron cleaning sponge 28 (FIG. 5).

In use, the solder spools 54, 55 and the copper de-solder braid spools 26, 27 may be positioned on the horizontal support member 17 (FIG. 5). The soldering iron 29 may be held in the soldering iron holder 21. The soldering station of the invention thereby provides a soldering station 10, 50 for conveniently dispensing different sizes of solders, copper de-solder braids together with the soldering iron holder 21 for the soldering iron 29 and the container 23 for the soldering iron cleaning sponge 28.

With reference to FIG. 6 and FIG. 7, the soldering station 70 may be used to hold the solder spools 54, 55 on the horizontal support member 17 and the solder spools 56, 57 on the horizontal support member 24. Alternatively, the horizontal support member 17 may be used to hold the solder spool 54 and the copper de-solder braid spools 26, 27.

The soldering station 10, 50, 70 may be manufactured at an extremely low cost by simply wire forming a round solid wire. For strength, wires with a diameter of ¼ inches or larger of metal or alloy materials are preferred. The manufacturing process can be accomplished by simply using a CNC wire forming machine or a forming and bending machine to form a wire into the desired configuration.

Advantageously, the soldering station 10, 50, 70 keeps different sizes of spools of solder, copper de-solder braids, a soldering iron cleaning sponge and a soldering iron all together on one place on a workbench.

The soldering station 10, 50, 70 provides a very low-cost, reliable, durable, easy to load, jam-proof, easy to manufacture soldering station 10, 50, 70 for conveniently dispensing different sizes of solders and copper de-solder braids and supporting the soldering iron 29 and the soldering iron cleaning sponge 28 in one apparatus.

The soldering station 10, 50, 70 provides an operator the ability to continuously draw different sizes of solders or copper de-solder braids with one hand and hold the soldering iron 29 with the other hand during the soldering operation. This will greatly improve the speed of the soldering operation.

I claim:

1. A soldering station for supporting a plurality of solder spools and a plurality of solder braid spools comprising:
    a base member;
    a sidewall extending upwardly from a first base member segment, the sidewall having a first pole extending upwardly from the first base member segment and a second pole descending from the first pole;
    a horizontal support member extending from the second pole distally of the first base member segment, the horizontal support member removably accepting the plurality of solder spools and the plurality of solder braid spools at a distal free end thereof; and
    wherein the second pole is sized and configured to provide clearance for the plurality of solder spools and the plurality of solder braid spools above the base member when the plurality of solder spools and the plurality of solder braid spools are accepted on the horizontal support member.

2. The soldering station according to claim 1, wherein the base member, the sidewall and the horizontal support member are formed of a single wire.

3. The soldering station according to claim 1, wherein the base member, the sidewall and the horizontal support member are formed of a single rod.

4. The soldering station according to claim 1, wherein the base member is sized and configured to hold a container.

5. The soldering station according to claim 1, wherein the horizontal support member comprises an upwardly extending spool stop formed at the distal free end thereof.

6. The soldering station according to claim 1, wherein the base member, the sidewall and the horizontal support member are formed by a wire-forming machine.

7. The soldering station according to claim 1, wherein the base member is coated with a frictional substance.

8. The soldering station according to claim 1, further comprising a soldering iron holder extending from a second base member segment.

9. The soldering station according to claim 1, further comprising a second sidewall extending upwardly from a second base member segment, the second sidewall having a first pole extending upwardly from the second base member segment and a second pole descending from the first pole, and a second horizontal support member having a distal free end, the second horizontal support member extending from the second pole distally from the second base member segment and the horizontal support member, and wherein the first base member segment and the second base member segment are parallel in spaced relationship one to the other.

10. The soldering station according to claim 8, wherein the first base member segment and the second base member segment are parallel in spaced relationship one to the other.

11. The soldering station according to claim 8, wherein the soldering iron holder comprises a circular funnel shaped coiled member.

12. The soldering station according to claim 8, wherein the soldering iron holder is coated with a heat insulation substance.

* * * * *